United States Patent
Aaron et al.

(10) Patent No.: US 6,848,039 B1
(45) Date of Patent: Jan. 25, 2005

(54) MULTIPLE PASS ARRANGEMENTS FOR MAXIMIZING CACHEABLE MEMORY SPACE

(75) Inventors: Larry D. Aaron, Irmo, SC (US); Bruce C. Edmonds, Columbia, SC (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 09/608,182

(22) Filed: Jun. 30, 2000

(51) Int. Cl.[7] ............................................. G06F 12/08
(52) U.S. Cl. ..................... 711/170; 711/118; 711/171
(58) Field of Search ................................ 711/100, 103, 711/118, 129, 144, 154, 170, 171

(56) References Cited

U.S. PATENT DOCUMENTS

| | | | | |
|---|---|---|---|---|
| 5,157,774 A | * | 10/1992 | Culley | 711/139 |
| 5,404,489 A | * | 4/1995 | Woods et al. | 711/152 |
| 5,539,894 A | * | 7/1996 | Webber | 711/128 |
| 5,551,006 A | * | 8/1996 | Kulkarni | 711/146 |
| 5,673,414 A | * | 9/1997 | Amini et al. | 711/146 |
| 5,893,141 A | * | 4/1999 | Kulkarni | 711/118 |
| 5,913,228 A | * | 6/1999 | Bedarida | 711/170 |
| 5,966,728 A | * | 10/1999 | Amini et al. | 711/146 |
| 6,044,478 A | * | 3/2000 | Green | 714/42 |
| 6,279,072 B1 | * | 8/2001 | Williams et al. | 711/105 |
| 6,611,911 B1 | | 8/2003 | O'Shea et al. | |

OTHER PUBLICATIONS

O'Shea et al.; "Bootstrap Processor Election Mechanism on Multiple Cluster Bus Systems", Patent Pending Ser. No. 10/384,444.

* cited by examiner

*Primary Examiner*—Tuan V. Thai
(74) *Attorney, Agent, or Firm*—Rob D. Anderson

(57) ABSTRACT

Multiple (e.g., dual) pass cache defining arrangements for maximizing cacheable memory space.

40 Claims, 6 Drawing Sheets

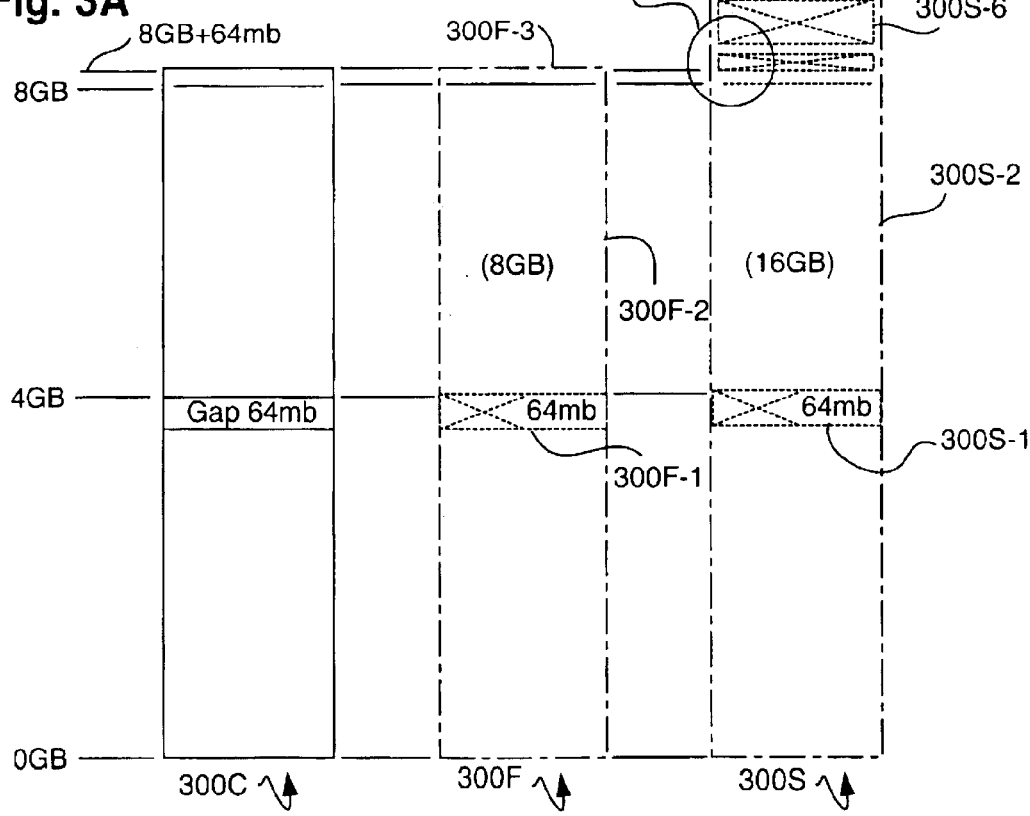

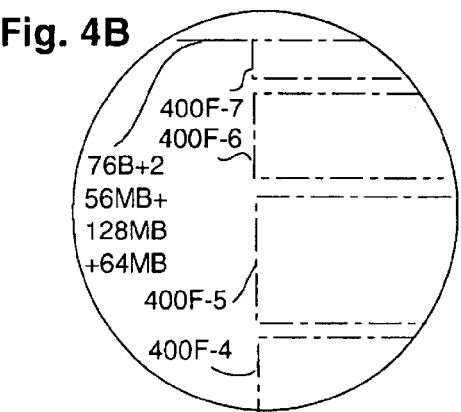
Fig. 4B
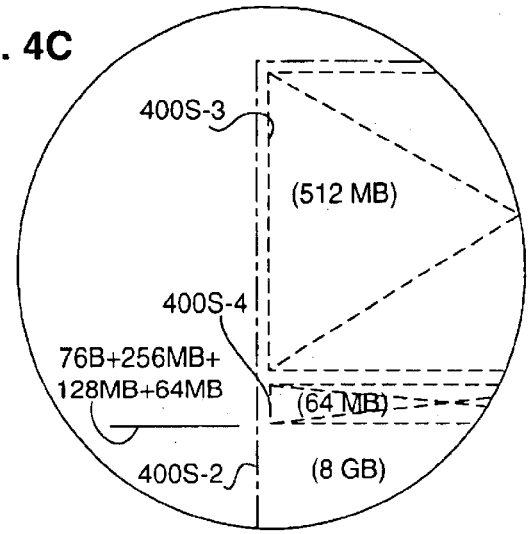
Fig. 4C
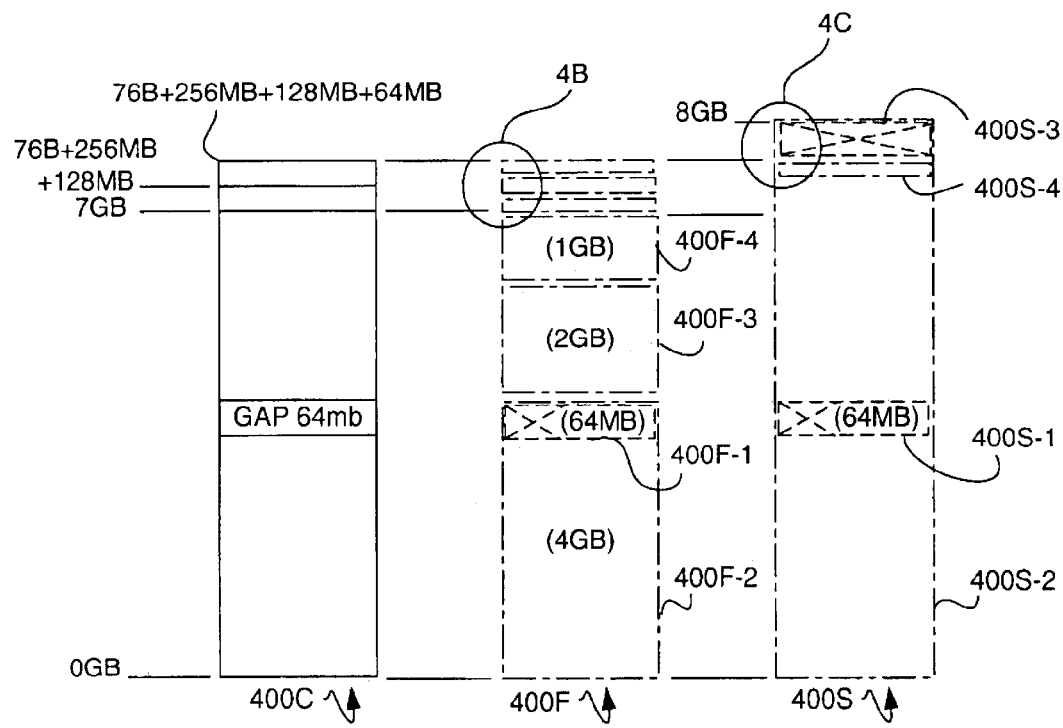

MULTIPLE PASS ARRANGEMENTS FOR MAXIMIZING CACHEABLE MEMORY SPACE

FIELD

The present invention is directed to efficient defining of cacheable memory space. More particularly, the present invention is directed to multiple (e.g., dual) pass arrangements for maximizing cacheable memory space.

BACKGROUND

The computer industry's devotion, commitment and adherence to support long existing BIOS (basic input/output system) functions have advantageously helped fuel the wide-spread (i.e., global) acceptance of computers and the explosion of the computer industries. However, such commitment and adherence have likewise been found to result in disadvantages as follows.

More particularly, BIOS has historically been embodied as an assembly language (i.e., machine code) program which is first loaded (even before the operating system (OS)) when a computer is started, and which provides the most basic, low-level, intimate control and supervision operations for the computer. More specifically, BIOS performs functions such as: POST (power-on/self-test); acting as an intermediary between different hardware; setting up (i.e., defining) cacheable memory space, finding/loading the OS (operating system).

With regard to setting up (i.e., initializing) of a system, typically within processor systems, a portion of memory will be set aside for use as cacheable memory space to serve as a fast internal cache memory for the purposes of "caching" slower physical memory in the system in an overall effort to increase the system's performance. The size of the portion of memory set aside for cacheable memory space may vary greatly from system to system, e.g., the cacheable memory space may be 64 MB (i.e., mega-byte), 106 MB, 3.5 GB (i.e., giga-byte), etc.

Historically, BIOS programming has been embodied in a singular or small number of monolithic blocks of intertwined assembly or machine code, such monolithic nature being illustrated by the singular dashed block 11 drawn around all of FIG. 1 BIOS functions. Intertwining often meant that changes were very difficult to make, as changes in one portion of the code often affected the operation of a remaining portions of the code. Accordingly, BIOS code is disadvantageously very difficult to write, debug and/or change. In view of BIOS' difficult assembly language programming and debugging, hardware companies typically have relied upon BIOS specialist companies (e.g., American Megatrends Inc. (AMI), Award Software, Microid Research (MR), Phoenix Technologies Ltd.) to provide BIOS code.

The desire for adherence to long existing BIOS code and the complexity of BIOS have sometimes resulted in complacency in the industry, resulting in minimal or no advances in some of the BIOS functions. The BIOS function of setting up of cacheable memory space is one function in need of improvement.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 3A includes an example block diagram of another example cacheable memory block useful in explanation of the invention, as well as additional block diagrams showing definition treatment of the memory block, whereas FIG. 3B shows a magnified view of a portion of FIG. 3A;

FIG. 4A includes an example block diagram of another example cacheable memory block useful in explanation of the invention, as well as additional block diagrams showing definition treatment of the memory block, whereas FIGS. 4B and 4C show magnified views of portions of FIG. 4A; and, FIGS. 5-8 are example flow diagrams showing operations with respect to example embodiments of the invention.

DETAILED DESCRIPTION

Figure 1:
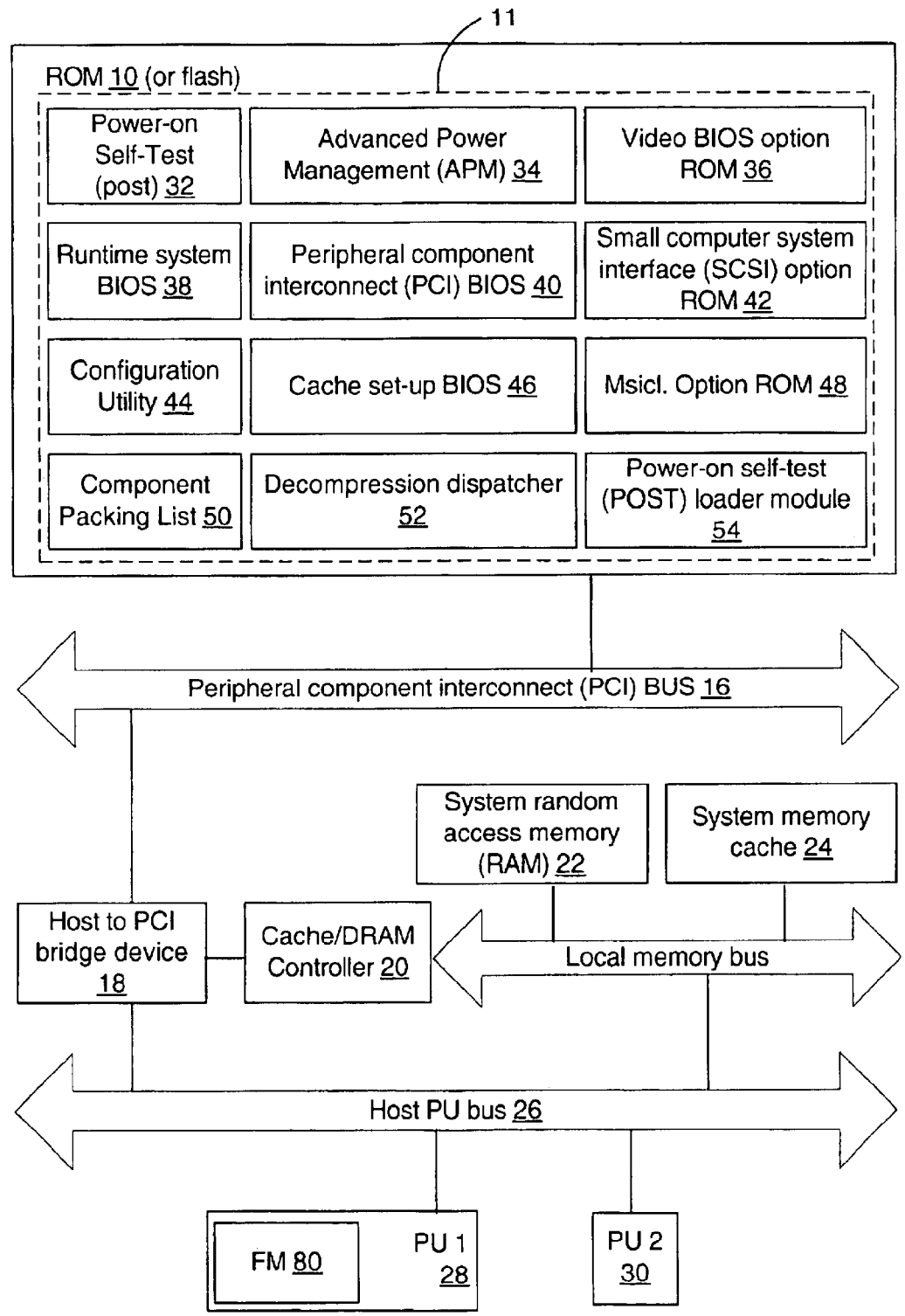
FIG. 1 is block diagram of an example system having an example advantageous firmware arrangement of one embodiment of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited thereto. Still further, cache memory blocks are not drawn to scale, and instead, example values are mentioned when appropriate. As a final note, well known power/ground connections to ICs and other components may not be shown within the FIGS. for simplicity of illustration and discussion, and so as not to obscure the invention.

Although example embodiments of the present invention will be described using an example system block diagram in an example personal computer (PC) environment, practice of the invention is not limited thereto, i.e., the invention may be able to be practiced with other types of systems, and in other types of environments (e.g., servers). Further, while example embodiments will be described using Memory Type Range Registers (MTRRS) and systems with P6 family processors (of Intel Corporation), practice of the invention is not limited thereto, i.e., the invention may be able to be practiced with other types of registers or cache defining arrangements, and in other types of processor environments.

Discussion turns first to FIG. 1 which is a block diagram of an example system having an example disadvantageous firmware arrangement. More particularly, the FIG. 1 example arrangement includes a Read-Only Memory ROM 10, a Dynamic Random Access Memory DRAM 22, a System Memory Cache 24, a Cache/DRAM Controller 20, and a plurality of Processor Units (PU) 28, 30, all provided along a Host Processor Unit (PU) Bus 26 and Local Memory Bus. The ROM 10 is connected to a Peripheral Component Interconnect (PCI) bus 16 (PCI Local Bus Specification Product Version, revision 2.1, published Jun. 1, 1995). A Host-to-PCI Bridge Device 18 bridges the PCI bus 16 and the Host PU Bus 26.

The BIOS may be encoded in ROM 10, and may contain a number of BIOS functions, e.g., a non-exhaustive listing including: power-on self-test (POST) 32; advanced power management (APM) 34; Video BIOS option 36; runtime system BIOS 38; Peripheral Component Interconnect (PCI) BIOS 40; small computer system interface (SCSI) option 42; configuration utility 44; cache set-up BIOS 46; miscellaneous options 48; component packing list 50; decompression dispatcher 52; and POST loader module 54.

On P6 family processors, in order for physical memory to be cacheable, it must be described using a fixed (i.e., predetermined) number of internal processor registers called Memory Type Range Registers (MTRRS). These registers also must be carefully programmed so that other address space in a computer system that should not be cached is not accidentally described as cacheable. Further, with respect to a block of memory available for cache memory, for efficiency purposes, all physical memory within that block should be defined within the MTRRS as being cacheable, because any physical memory that is not cacheable represents unavailable/unused resources which has the potential to slow the performance of the overall system. Therefore, in order to maximize system performance, these registers must be programmed to maximize the cacheable physical memory space without describing more space than the amount of actual physical memory. Due to the granularity constraints of these registers and the design constraints of compatible Intel Architecture computer systems, the establishment of a software algorithm to initialize these registers for all possible physical memory configurations supportable by a given hardware system may be a difficult task. The present invention establishes a software algorithm that attempts to solve this problem in a generic manner.

As mentioned previously, typically, the BIOS software configures the MTRRS. In one example BIOS (i.e., OCPRF100 BIOS from Pheonix Technologies), the BIOS sets the MTRRS after PCI resources have been assigned and system memory has been tested. The BIOS uses the fixed range MTRRS to describe regions below 1 MB, and variable range MTRRS to describe the rest of memory space. The example processor contains eight variable range MTRRS, of which two (i.e., according to predetermined rules) must be left free for use by the operating system. Thus, BIOS can use only six variable range MTRRS to define the cacheable memory space. The processor permits MTRR ranges to overlap in specific cases. If a fixed range MTRR and a variable range MTRR refer to the same region of memory, the processor honors the fixed range MTRR. If two variable range MTRRS overlap, uncacheable (UC) and write protect (WP) supercede writeback cacheable (WB) memory space. Other types of overlap may produce undocumented or unexpected results.

Use of MTRRS may further have predetermined range size and alignment requirements. A minimum range size for an MTRR may be 4 KB (i.e., kilo-bytes), for example, and a base address of this range may have to be on a 4 KB boundary. For ranges greater that 4 KB, each range may have to be of a length $2^n$ and its base address may have to be aligned on a $2^n$ boundary, where n is a value equal to or greater than 12. As a still further example predetermined requirement, the base address alignment value may not be less than its length. For example, an 8 KB range may not be aligned on a 4 KB boundary, i.e., it must be aligned on at least an 8 KB boundary. Additionally, the length of a region of memory described by a variable range MTRR may have to be a power of two. Further, the region may have to start on a boundary that is a multiple of its length.

For example, a single register may describe a 4-MB block but not a 6-MB block. That 4-MB block can start at 104 MB or 108 MB, but not 106 MB. Other sizes require multiple MTRRS. For example, to describe a 3.5-GB system, BIOS programs a 2-GB block, a 1-GB block, and a 512-MB block. Such a configuration consumes three MTRRS. For further teachings regarding MTTRS and cache memory, attention is directed to pages 9–17 to 9–31 from the *Intel Architecture Software Developer's Manual, Volume* 3 *System Programming Guide,* 1997.

In preparation of the present invention, the cache set-up function of a Phoenix™ Technologies BIOS software was studied with respect to the existing algorithm for programming MTRRS. It can be described as a bottom-up approach starting at address 0 and working towards the top of memory by powers of 2, until all available variable MTRRS are exhausted in attempting to define the cache memory block size. Any remaining memory is left UC. The following pseudo-code attempts to describe the Phoenix algorithm:

---

OldProgramMTRRS (takes top of memory and any gaps below top of memory as inputs);
COMMENT: If any gaps exist, they must be power of 2 in size and the start address must be a boundary of the size
    Var Index, CurrentBaseAddress, CurrentUndescribedMemory, CurrentBlockSize
    Index = 1
    If (Gap != 0) Then
        MTRR(Index) BaseAddress := (Gap base address)
        MTRR(Index) Size := (Gap size)
        Index := Index + 1
    EndIf
    CurrentBaseAddress := 0
    CurrentUndescribedMemory := (top of memory)
    Repeat
        CurrentBlockSize :=
        FindLargestBlock(CurrentUndescribedMemory)
            // The FindLargestBlock routine determines the largest power
            // of 2 that is <= CurrentUndescribedMemory
        MTRR(Index) BaseAddress := CurrentBaseAddress
        MTRR(Index) Size := CurrentBlockSize
        Index := Index + 1
        CurrentBaseAddress := CurrentBaseAddress + CurrentBlockSize
        CurrentUndescribedMemory :=
CurrentUndescribedMemory − CurrentBlockSize
    Until ((Index >= 7) OR (CurrentUndescribedMemory = 0))
    return
EndOldProgramMTRRS.

---

Figure 2:
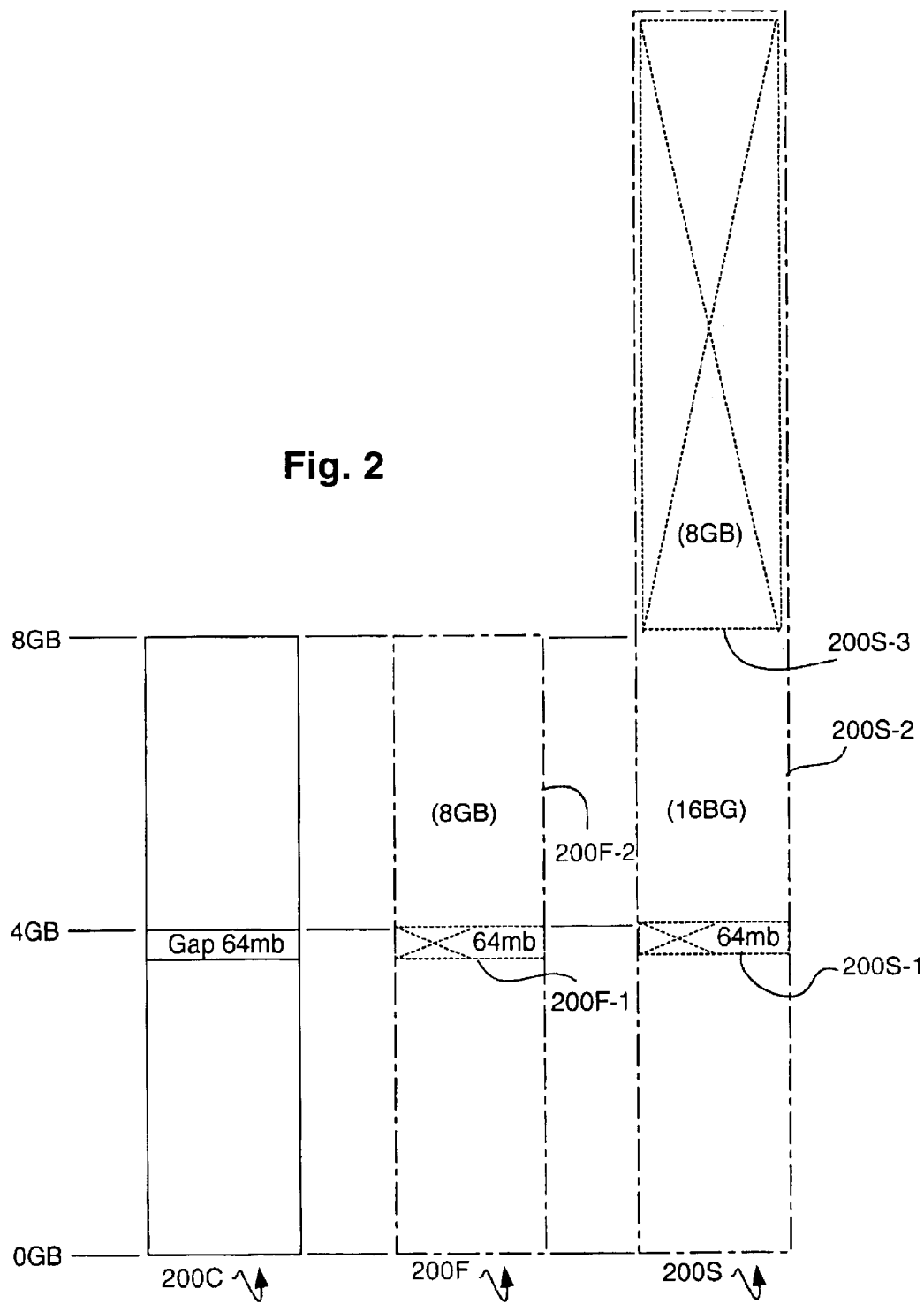
FIG. 2 includes an example block diagram of a first example cacheable memory block useful in explanation of the invention, as well as additional block diagrams showing definition treatment of the memory block.

FIG. 2 illustrates an example 8 GB (giga-byte) block 200C of physical memory having a 64 MB (mega-byte) gap therein, which may exist within a system, and which is available for definition as cacheable memory space. A center portion 200F of FIG. 2 illustrates how, using the above algorithm, the MTRRS are used to define the cacheable memory space with respect to the physical memory. Within FIG. 2 and similar FIGS., short-dashed-line blocks with an "X" therein (e.g., 200F-1) will be used to illustrate uncacheable (UC) and write protect (WP) memory space, whereas long/short-dashed-line blocks (e.g., 200F-2) will be used to illustrate writeback cacheable (WB) memory space. Again, with any overlap, UC and WP supercede WB memory space. Further, within FIG. 2 and similar FIGS., a byte size of dashed-line blocks will be illustrated within parenthesis (e.g., "(8 GB)").

Returning to discussion of the FIG. 2 center portion 200F, a first MTRR is used to define the 64 MB gap as illustrated by the short-dashed block 200F-1, and a second MTRR is used to define the overall 8 GB block as illustrated by the long/short-dashed-line block 200F-2. Accordingly, using the above algorithm, two MTRRS are used to define the 8 GB memory space 200C. Therefore, it can be seen that in the FIG. 2 example, the above algorithm would define cacheable memory space efficiently.

MTRR programming becomes more complicated when system memory grows large enough to overlap PCI resources. PCI resources can not be allowed to be cacheable. The BIOS programs MTRRS that describe system memory plus an additional MTRR that describes the overlap. Due to a Memory Reclaiming feature supported by some hardware, the top of memory may be adjusted to account for the remapped memory. For example, FIGS. 3A-3B illustrate an example system with 8 GB of memory and a 64-MB High Memory Gap (HMG).

More particularly, FIG. 3A shows the effect of reclaiming on the system memory map. In this example, the system contains 8 GB of memory with a 64 MB gap just below 4 GB. Beginning at the gap, the BIOS shifts the physical mapping upward by the size of the gap. The top of system memory is shifted upward by the size of the gap. Due to reclaiming, the top of memory in this FIG. 3A example is thus not the same as the FIG. 1 8 GB top of memory, but instead is 8 GB+64 MB as illustrated by the physical memory block 300C. For such a system, the BIOS (using the algorithm described by OldProgramMTRRS) programs the MTRRS as follows:

One MTRR describes a 64-MB HMG from 0_FC00_0000h to 0_FFFF_FFFFh as UC. This range takes precedence over any WB range that it overlaps.

One MTRR describes an 8-GB block of system memory from 0_0000_0000h to 1_FFFF_FFFFh as WB. Note that the fixed range MTRRS take precedence in the lower 1 MB of this region.

One One MTRR describes a 64-MB block of system memory from 2_0000_0000h to 2_03F0_0000h as WB.

Accordingly, directing attention to a center portion 300F of FIG. 3A, a first MTRR is used to define the 64 MB gap as illustrated by the short-dashed block 300F-1, a second MTRR is used to define the 8 GB block as illustrated by the long/short-dashed-line block 300F-2, and a third MTRR is used to define the +64 MB block as illustrated by the long/short-dashed-line block 300F-3. Accordingly, using the above algorithm, three MTRRS are used to define the 8 GB+64 MB memory space 300C. Again, in the FIG. 3 example, the above algorithm would define cacheable memory space efficiently.

Some hardware platforms are capable of supporting memory configurations that cannot be fully described using the algorithm given above. Consider, for example, a system with 7 GB and 384 MB of system memory and a 64-MB HMG, as illustrated within FIG. 4A by cacheable memory block 400C. After reclaiming the gap, the top of memory becomes 7 GB and 448 MB. By the original method, it would take one MTRR to describe the gap and six MTRRS to describe system memory (4 GB+2 GB+1 GB+256 MB+128 MB+64 MB). More particularly, attention is directed to the center portion 400F as well as magnified view FIG. 4B (i.e., magnified view of FIG. 4A's encircled area 4B), for illustration of the seven (7) MTTR "blocks", i.e., 400F-1, 400F-2, 400F-3, 400F-4, 400F-5, 400F-6 and 400F-7.

Since BIOS is not allowed to use more than six MTRRS, the last 64 MB range in the example (i.e., MTRR "block" 400F-7) would have to be left uncacheable. This could negatively impact the performance of the system if it happened to try to use any of the uncacheable memory. The present invention provides an advantageous solution with the a multi-pass capable algorithm.

More particularly, the multi-pass starts using an example single pass (i.e., first type of) method in an attempt to describe the physical memory. If this method (e.g., the example of FIG. 4A) consumes more MTRRS than the six that BIOS is allowed to use, the multi-pass BIOS uses an alternate (e.g., second pass or second type of) method. The first pass or first type of algorithm, i.e., the OldProgramMTRRS program, can be looked at essentially as a bottom-up or additive-type algorithm in that (except for definition of the gap) the largest "block" which fits within the available cacheable memory space is defined using an MTTR, and then progressively smaller additional "blocks" are then progressively defined using subsequent MTTRS and cumulatively added until useable MTTRS are depleted, and any remaining memory is left as undescribed/uncacheable.

In contrast, the example second pass or second type of algorithm of the present invention can be looked at essentially as a top-down or subtractive-type algorithm in that the largest "block" which fits within the available cacheable memory space and then multiplied by two (2) is defined using an MTTR, and then progressively smaller "blocks" progressively defined using subsequent MTTRS are subtracted therefrom (i.e., defined as UC) until useable MTTRS are depleted. That is, in the alternate method, the BIOS uses one MTRR to describe a block that is larger than the actual amount of cacheable memory, and then uses remaining MTRRS to trim away UC addresses. The following pseudo-code describes an example multi-pass or two-type capable algorithm:

NewProgramMTRRS (takes top of memory and any gaps below top of memory as inputs);

COMMENT: If any gaps exist, they must be power of 2 in size and the start address must be a boundary of the size

---

```
Var Index, CurrentBaseAddress, CurrentUndescribedMemory,
CurrentBlockSize, PassCount
    Index = 1
    If (Gap != 0) Then
        MTRR(Index) BaseAddress := (Gap base address)
        MTRR(Index) Size := (Gap size)
        Index := Index + 1
    EndIf
    PassCount := 1;
    // First try the bottom-up approach
BottomUpApproach::
    CurrentBaseAddress := 0;
    CurrentUndescribedMemory := (top of memory)
    Repeat
        CurrentBlockSize :=
        FindLargestBlock(CurrentUndescribedMemory)
        MTRR(Index) BaseAddress := CurrentBaseAddress
        MTRR(Index) Size := CurrentBlockSize
        Index := Index + 1
        CurrentBaseAddress :=
        CurrentBaseAddress + CurrentBlockSize
        CurrentUndescribedMemory :=
        CurrentUndescribedMemory - CurrentBlockSize
    Until ((Index >= 7) OR (CurrentUndescribedMemory = 0));
    If (CurrentUndescribedMemory = 0) Then GOTO Exit
    If PassCount = 2 Then GOTO Exit
    // Second try the top-down approach
    CurrentUndescribedMemory = (top of memory)
    CurrentBlockSize :=
    FindLargestBlock(CurrentUndescribedMemory)
```

-continued

```
      CurrentBlockSize := CurrentBlockSize * 2
      MTRR(Index) BaseAddress := 0
      MTRR(Index) Size := CurrentBlockSize
      Index := Index + 1
      CurrentBaseAddress =: CurrentBlockSize
      CurrentUndescribedMemory = CurrentBlockSize -
      CurrentUndescribedMemory
      While ((Index <= 7) AND (CurrentUndescribedMemory != 0))
         {
         CurrentBlockSize :=
         FindLargestBlockSize (CurrentUndescribedMemory)
         CurrentBaseAddress :=
         CurrentBaseAddress - CurrentBlockSize
         MTRR(Index) BaseAddress := CurrentBaseAddress
         MTRR(Index) Size := CurrentBlockSize
         Index := Index + 1
         CurrentUndescribedMemory :=
         CurrentUndescribedMemory - CurrentBlockSize
         }
      If (CurrentUndescribedMemory != 0) Then
         PassCount := 2
         GOTO BottomUpApproach
      Endif
Exit:
      return
EndNewProgramMTRRS
```

Using this alternate algorithm, the FIG. 4A cacheable memory space 440C of 7 GB+256 MB+128 MB+64 MB can be defined, for example, using only four MTRRS of:

One MTRR describes a 64-MB HMG from 0_FC00_0000h to 0_FFFF_FFFFh as UC. This range takes precedence over the WB range it overlaps.

One MTRR describes an 8-GB block of system memory from 0_0000_0000h to 1_FFFF_FFFFh as WB. As before, the fixed range MTRRS take precedence in the lower 1 MB of this region.

One MTRR describes a 512-MB block of system address space from 1_E000_0000h to 1_FFFF_FFFFh as UC. This range takes precedence over the WB range it overlaps.

One MTRR describes a 64-MB block of system address space from 1_DC00_0000h to 1_DFFF_FFFFh as UC. This range takes precedence over the WB range it overlaps.

Accordingly, directing attention to a right-hand portion 400S of FIG. 4A, a first MTRR is used to define the 64 MB gap as illustrated by the short-dashed block 400S-1, a second MTRR is used to define a 8 GB block (i.e., two times the 4 GB (i.e., largest) block fitting within the cacheable memory space) as illustrated by the long/short-dashed-line block 400S-2, a third MTRR is used to define a −512 MB block as illustrated by the long/short-dashed-line block 400S-3 in FIG. 4A as well as magnified view FIG. 4C (i.e., magnified view of FIG. 4A's encircled area 4C), and a fourth MTRR is used to define a −64 MB block as illustrated by the long/short-dashed-line block 400S-4. Accordingly, using second pass or second-type algorithm, four MTRRS may be used to define the 8 GB+256 MB+128 MB+64 MB memory space 400C. Note that with this 8 GB+256 MB+128 MB+64 MB example, the second pass or second-type algorithm gives better cacheable-memory-defining results over the first pass or first-type algorithm, in that only four MTRRS are required as opposed to the previous seven.

With regard to further discussion of the invention, it should be noted that the second pass or second-type algorithm (e.g., top-down approach) does not always give better cacheable-memory-defining results over the first pass or first-type algorithm (e.g., bottom-up approach). More particularly, directing attention first to a right-hand portion 200S of FIG. 2, note that three MTRRS (as illustrated by blocks 200S-1, 200S-2 and 200S-3) are required using the second pass or second-type algorithm, which is not an improvement over the first pass or first-type algorithm which only required two MTRRS (i.e., as illustrated by blocks 200F-1 and 200F-2). However, note that either algorithm could be validly used, as the requirement of not using more that six MTRRS has not been violated in either case.

The FIG. 3A example might be a more interesting example showing that the second pass or second-type algorithm does not always give better cacheable-memory-defining results over the first pass or first-type algorithm. More particularly, directing attention first to a right-hand portion 300S of FIG. 3A as well as magnified view FIG. 3B (i.e., magnified view of FIG. 3A's encircled area 3B), note that eight MTRRS (as illustrated by blocks 300S-1, 300S-2, 200S-3, 300S-4, 300S-5, 300S-6, 300S-7 and 300S-8) are required using the second pass or second-type algorithm, which is not an improvement over the first pass or first-type algorithm which only required three MTRRS (i.e., as illustrated by blocks 300F-1, 300F-2 and 200F-3). Note that the second pass or second type algorithm would be disadvantageous to use, in that once six MTRRS were depleted, the cacheable memory space still would not be properly/completely defined leading to inefficiency, and disadvantageous results (e.g., system crashes or errors) could occur.

The example dual pass method attempts to properly describe all possible configurations using the supported DIMM sizes on OCPRF100 memory carriers with any combination of PCI cards. However, it should be noted that memory failures can create situations where small blocks cannot be described properly as cacheable memory. This occurs because the granularity of the OCPRF100 Extended Memory Test is 1 MB. Describing memory to this level of granularity can consume more MTRRS than are available. The small amount of leftover memory is left UC.

Because the above arrangement is an enhancement, any product that takes this code is certain to configure MTRRS at least as well as the previous arrangement, regardless of the given memory configuration. The real value of this arrangement is that it enables systems to have higher performance in certain memory configurations than otherwise possible.

Figures 5, 6:
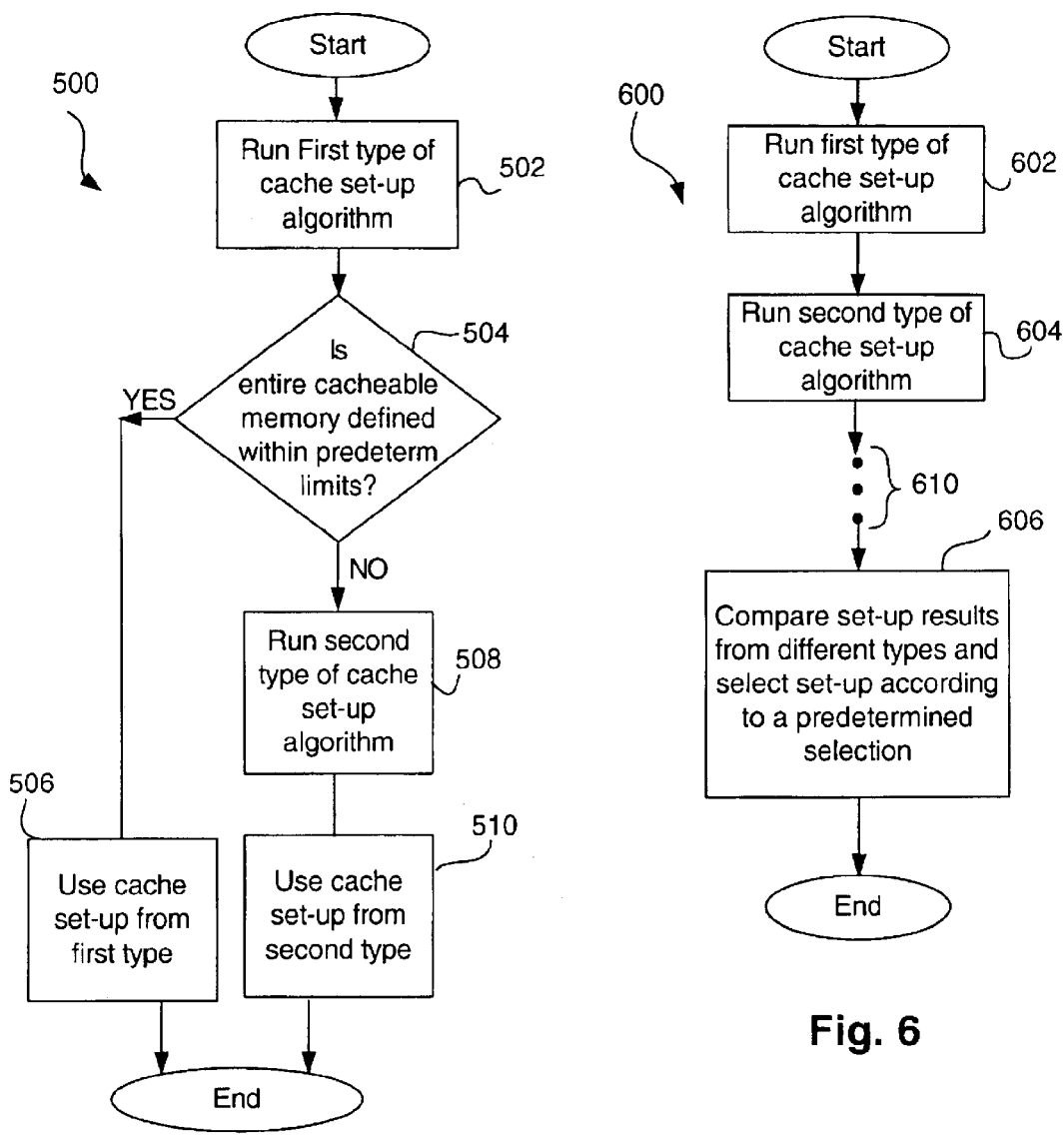

The above-described cache set-up arrangement runs a second or differing type of cache set-up algorithm only if a first type of cache set-up algorithm is not able to define the entire cacheable memory within predetermined limits, e.g., using a predetermined number of MTRRS. More particularly, attention is directed to FIG. 5 which generically illustrates such arrangement in block-diagram flow form as flow 500. After Start, in block 502, a first type of cache set-up algorithm is run. In block 504, it is determined whether the entire cacheable memory is defined within predetermined limits. If yes, the second type of cache set-up algorithm is never run, and instead, as indicated in block 506, the cache set-up from the first type is used. If instead, block 504 determines that the entire cacheable memory is not defined within predetermined limits, the second type of cache set-up algorithm is run in block 508, and the cache set-up from the second type is used as indicated in block 510.

Instead of running the second or differing type of cache set-up algorithm only if a first type of cache set-up algorithm is not able to define the entire cacheable memory within predetermined limits, embodiments of the present invention can be practiced where all alternative types of cache set-up algorithms are run and compared according to a predetermined selection. More particularly, attention is directed to FIG. 6 which generically illustrates such arrangement in block-diagram flow form as flow 600. After Start, in block 602 a first type of cache set-up algorithm is run, in block 604 a second type of cache set-up algorithm is run, and so on as indicated by reference numeral 610. In block 606, the set-up results from the different types are compared, and a set-up to be used is selected according to a predetermined selection. For example, a set-up which resulted in a least amount of MTRRS being used might be selected; note that this would be particularly advantageous in systems where all unused (i.e., leftover) MTRRS could be used by the system for other purposes. If multiple set-up algorithms result in a same minimum number of MTRRS being used, some set-up algorithms might be preferred according to a predetermined hierarchy scheme.

Figure 7:
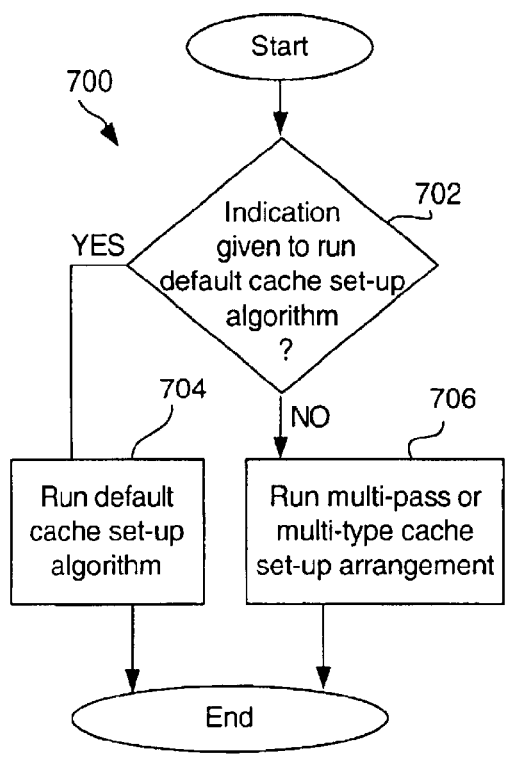

Continuing discussion, as mentioned previously, BIOS code is typically an intertwined monolithic code. Often, even the smallest change in operation of one part of BIOS may affect the way other parts of BIOS operate. Accordingly there may be times when it is desired that a definite algorithm (e.g., a historical or long existing cache set-up algorithm) be used for cache set-up, for example, a program may have been written to assume that cache set-up was made using the definite algorithm. More particularly, attention is directed to FIG. 7 which generically illustrates a suitable arrangement in block-diagram flow form as flow 700. After Start, in block 702 it is checked whether or not an indication (e.g., activation of predetermined key(s)) has been given (e.g., during system initialization) to indicate that a predetermined default cache set-up algorithm should be used. If yes, a default cache set-up algorithm is run (block 704). If no, a multi-pass or multi-type cache set-up arrangement is run (block 706).

Figure 8:
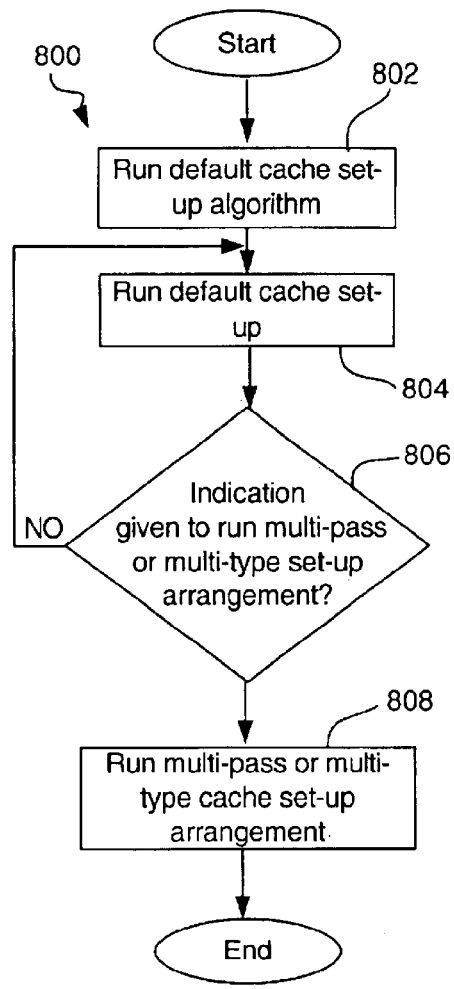

FIG. 8 illustrates another alternative, i.e., generically illustrates a suitable arrangement in block-diagram flow form as flow 800. After Start, in block 802 a de fault cache set-up algorithm is run, and in block 804 the default cache set-up is run. In block 806, it is checked whether or not an indication (e.g., activation of predetermined key(s)) has been given (e.g., by manual input by a user upon noticing sluggish performance) to indicate that a multi-pass or multi-type cache set-up arrangement should be run to determine a new cache set-up. If no, the default cache set-up is continued to be run (block 804). If yes, a multi-pass or multi-type cache set-up arrangement is run (block 808).

While BIOS has been historically written as a monolithic block of intertwined code, embodiments of the present invention may break from such pattern, an entirety of the cache set-up arrangement, or individual types of cache set-up algorithms, can be written as a separate, independent (i.e., separately loadable/executable) utility or file. That is, an independent utility or file as a self-contained image that performs a cache set-up task or function. Use of a separate, independent utility or file avoids confusing code intertwining, making the individual function more easily handled, implemented and understood by programmers. Still further, by using an independent utility or file system, individual utilities or files can be selectively run/deactivated or loaded/unloaded at will, i.e., each utility or file is independently loadable/executable.

Recently, the ROM 10 is often replaced by a FLASH memory. More specifically, FLASH is a type of EEPROM (electrically erasable programmable read-only memory) chip that can be erased and reprogrammed directly in the system without using ultraviolet light and an EPROM programmer device. Using FLASH ROM enables a manufacturer to send out ROM upgrades on disk or Internet downloads; such upgrades can then be loaded into the FLASH ROM chip on the motherboard without removing and replacing the chip. This method saves time and money for both the system manufacturer and the end-user, and adds advantageous/attractive versatility. As further alternatives, BIOS contents may instead be provided in any other non-volatile memory, e.g., on a hard-drive (not shown) or within a firmware (FM) memory 80 (FIG. 1) integrated within a processor module, such as for PU1 28.

While the foregoing example embodiments describe a first pass or first type of algorithm and a second pass or second type of algorithm, practice of the present invention is not limited to use with just two types of passes or algorithms, e.g., the present invention can be embodied having three or more (i.e., a library of) possible algorithms which can be alternatively checked so as to attempt to maximize cacheable memory space definition.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

For example, while the above example embodiments generally have been described as running the various cache-defining algorithms substantially sequentially in multi-passes, (e.g., first the bottom-up approach and then the top-down approach), practice of the invention is not limited thereto, i.e., practice of the invention may be made by running the various cache-defining algorithms substantially in parallel, or any combination of sequential and parallel. In addition, the present invention may be implemented with any type of C-language, or any other programming language may be used.

What is claimed is:

1. A cache defining arrangement comprising:
   an arrangement having at least two mutually different defining schemes for defining cacheable memory space, wherein the at least two mutually different defining schemes each attempt to define a same cacheable memory space; and
   a predetermined selection algorithm to select which result from said at least two mutually different defining schemes should be used for defining said cacheable memory space, the predetermined selection algorithm to select the result that most advantageously defines the same cacheable memory space.

2. A cache defining arrangement as claimed in claim 1, wherein said cache defining arrangement is adapted to run each scheme of said at least two mutually different defining schemes for defining cacheable memory space, sequentially one after another.

3. A cache defining arrangement as claimed in claim 1, wherein said cache defining arrangement is adapted to run each scheme of said at least two mutually different defining schemes for defining cacheable memory space, at least partially in parallel with one another.

4. A cache defining arrangement as claimed in claim 1, wherein said cache defining arrangement is adapted to run each scheme of said at least two mutually different defining schemes for defining cacheable memory space, and wherein said cache defining arrangement comprises a predetermined selection algorithm to select which result from said at least two mutually different defining schemes should be used for defining said cacheable memory space.

5. A cache defining arrangement as claimed in claim 1, wherein said cache defining arrangement is adapted to run a default scheme for defining said cacheable memory space to determine whether said cacheable memory space can be defined within predetermined resources, and if not, said cache defining arrangement is adapted to run at least one alternate scheme for defining said cacheable memory space.

6. A cache defining arrangement as claimed in claim 1, comprising a selection arrangement adapted to allow selection to run only a predetermined default scheme of said at least two mutually different defining schemes for defining said cacheable memory space.

7. A cache defining arrangement as claimed in claim 1, the predetermined selection algorithm to select the result that requires a least number of registers.

8. A cache defining arrangement as claimed in claim 7, wherein the registers are internal processor registers.

9. A cache defining arrangement as claimed in claim 8, wherein the internal processor registers are memory type range registers.

10. A cache defining arrangement as claimed in claim 1, wherein the cacheable memory space is not entirely in contiguous address locations.

11. A system comprising:
a cache defining arrangement comprising an arrangement having at least two mutually different defining schemes for defining cacheable memory space, wherein the at least two mutually different defining schemes each attempt to define a same cacheable memory space; and
a predetermined selection algorithm to select which result from said at least two mutually different defining schemes should be used for defining said cacheable memory space, the predetermined selection algorithm to select the result that most advantageously defines the same cacheable memory space.

12. A system as claimed in claim 11, wherein said cache defining arrangement is adapted to run each scheme of said at least two mutually different defining schemes for defining cacheable memory space, sequentially one after another.

13. A system as claimed in claim 11, wherein said cache defining arrangement is adapted to run each scheme of said at least two mutually different defining schemes for defining cacheable memory space, at least partially in parallel with one another.

14. A system as claimed in claim 11, wherein said cache defining arrangement is adapted to run each scheme of said at least two mutually different defining schemes for defining cacheable memory space, and wherein said cache defining arrangement comprises a predetermined selection algorithm to select which result from said at least two mutually different defining schemes should be used for defining said cacheable memory space.

15. A system as claimed in claim 11, wherein said cache defining arrangement is adapted to run a default scheme for defining said cacheable memory space to determine whether said cacheable memory space can be defined within predetermined resources, and if not, said cache defining arrangement is adapted to run at least one alternate scheme for defining said cacheable memory space.

16. A system as claimed in claim 11, comprising a selection arrangement adapted to allow selection to run only a predetermined default scheme of said at least two mutually different defining schemes for defining said cacheable memory space.

17. A system as claimed in claim 11, the predetermined selection algorithm to select the result that requires a least number of registers.

18. A system as claimed in claim 17, wherein the registers are internal processor registers.

19. A system as claimed in claim 18, wherein the internal processor registers are memory type range registers.

20. A system as claimed in claim 11, wherein the cacheable memory space is not entirely in contiguous address locations.

21. A cache defining method comprising:
running at least two mutually different defining schemes for defining cacheable memory space, wherein the at least two mutually different defining schemes each attempt to define a same cacheable memory space; and
selecting which result from said at least two mutually different defining schemes should be used for defining said cacheable memory space by selecting the result that most advantageously defines the same cacheable memory space.

22. A cache defining method as claimed in claim 21, wherein said cache defining method is adapted to run each scheme of said at least two mutually different defining schemes for defining cacheable memory space, sequentially one after another.

23. A cache defining method as claimed in claim 21, wherein said cache defining method is adapted to run each scheme of said at least two mutually different defining schemes for defining cacheable memory space, at least partially in parallel with one another.

24. A cache defining method as claimed in claim 21, wherein said cache defining method is adapted to run each scheme of said at least two mutually different defining schemes for defining cacheable memory space, and wherein said cache defining method comprises a predetermined selection algorithm to select which result from said at least two mutually different defining schemes should be used for defining said cacheable memory space.

25. A cache defining method as claimed in claim 21, wherein said cache defining method is adapted to run a default scheme for defining said cacheable memory space to determine whether said cacheable memory space can be defined within predetermined resources, and if not, said cache defining method is adapted to run at least one alternate scheme for defining said cacheable memory space.

26. A cache defining method as claimed in claim 21, comprising a selection arrangement adapted to allow selection to run only a predetermined default scheme of said at least two mutually different defining schemes for defining said cacheable memory space.

27. A cache defining method as claimed in claim 21, wherein the selecting selects the result that requires a least number of registers.

28. A cache defining method as claimed in claim 27, wherein the registers are internal processor registers.

29. A cache defining method as claimed in claim 28, wherein the internal processor registers are memory type range registers.

30. A cache defining method as claimed in claim 21, wherein the cacheable memory space is not entirely in contiguous address locations.

31. An article comprising:

a computer readable medium having instructions thereon which when executed cause a computer to:

run at least two mutually different defining schemes for defining cacheable memory space, wherein the at least two mutually different defining schemes each attempt to define a same cacheable memory space; and select which result from said at least two mutually different defining schemes should be used for defining said cacheable memory space, the selecting to select the result that most advantageously defines the same cacheable memory space.

32. An article as claimed in claim 31, the computer readable medium having instructions thereon which when executed further cause a computer to:

run each scheme of said at least two mutually different defining schemes for defining cacheable memory space, sequentially one after another.

33. An article as claimed in claim 31, the computer readable medium having instructions thereon which when executed further cause a computer to:

run each scheme of said at least two mutually different defining schemes for defining cacheable memory space, at least partially in parallel with one another.

34. An article as claimed in claim 31, the computer readable medium having instructions thereon which when executed further cause a computer to:

run each scheme of said at least two mutually different defining schemes for defining cacheable memory space; and select which result from said at least two mutually different defining schemes should be used for defining said cacheable memory space.

35. An article as claimed in claim 31, the computer readable medium having instructions thereon which when executed further cause a computer to:

run a default scheme for defining said cacheable memory space to determine whether said cacheable memory space can be defined within predetermined resources, and if not, run at least one alternate scheme for defining said cacheable memory space.

36. An article as claimed in claim 31, the computer readable medium having instructions thereon which when executed further cause a computer to:

allow selection to run only a predetermined default scheme of said at least two mutually different defining schemes for defining said cacheable memory space.

37. An article as claimed in claim 31, the computer readable medium having instructions thereon which when executed further cause a computer to:

select the result that requires a least number of registers.

38. An article as claimed in claim 37, wherein the registers are internal processor registers.

39. An article as claimed in claim 38, wherein the internal processor registers are memory type range registers.

40. An article as claimed in claim 31, wherein the cacheable memory space is not entirely in contiguous address locations.

\* \* \* \* \*

UNITED STATES PATENT AND TRADEMARK OFFICE
CERTIFICATE OF CORRECTION

PATENT NO. : 6,848,039 B1  
APPLICATION NO. : 09/608182  
DATED : January 25, 2005  
INVENTOR(S) : Aaron et al.

It is certified that error appears in the above-identified patent and that said Letters Patent is hereby corrected as shown below:

In column 10, at line 57, after "memory space" insert --;wherein in a bottom-up scheme, mainly substantially additive blocks of cacheable memory space are defined so as to cumulatively define said cacheable memory space, and wherein in a top-down scheme, an oversized block of cacheable memory space is defined, and then mainly substantially subtractive blocks of cacheable memory space are subtracted so as to subtractively define said cacheable memory space.--.

In column 11, at line 43, after "memory space" insert --;wherein in a bottom-up scheme, mainly substantially additive blocks of cacheable memory space are defined so as to cumulatively define said cacheable memory space, and wherein in a top-down scheme, an oversized block of cacheable memory space is defined, and then mainly substantially subtractive blocks of cacheable memory space are subtracted so as to subtractively define said cacheable memory space.--.

In column 12, at line 26, after "memory space" insert --;wherein in a bottom-up scheme, mainly substantially additive blocks of cacheable memory space are defined so as to cumulatively define said cacheable memory space, and wherein in a top-down scheme, an oversized block of cacheable memory space is defined, and then mainly substantially subtractive blocks of cacheable memory space are subtracted so as to subtractively define said cacheable memory space.--.

In column 13, at line 13, after "memory space" insert --;and define in a bottom-up scheme, mainly substantially additive blocks of cacheable memory space so as to cumulatively define said cacheable memory space, and define, in a top-down scheme, an oversized block of cacheable memory space, and then mainly substantially subtractive blocks of cacheable memory space are subtracted so as to subtractively define said cacheable memory space.--.

Signed and Sealed this

Nineteenth Day of September 2006

JON W. DUDAS  
*Director of the United States Patent and Trademark Office*